(No Model.)  12 Sheets—Sheet 2.

H. R. CORKHILL, Sr.
PAPER BAG MACHINE.

No. 361,746. Patented Apr. 26, 1887.

Attest:
C. B. Nash.
H. B. Knight.

Inventor:
Henry R. Corkhill, Sr.
By E. B. Whitmore, Atty.

(No Model.)

H. R. CORKHILL, Sr.
PAPER BAG MACHINE.

No. 361,746. Patented Apr. 26, 1887.

(No Model.) 12 Sheets—Sheet 5.

H. R. CORKHILL, Sr.
PAPER BAG MACHINE.

No. 361,746. Patented Apr. 26, 1887.

Attest:
C. B. Nash,
N. B. Knight.

Inventor:
Henry R. Corkhill, Sr.
By E. B. Whitmore, Atty.

(No Model.)

H. R. CORKHILL, Sr.
PAPER BAG MACHINE.

No. 361,746. Patented Apr. 26, 1887.

Attest:
C. B. Nash.
H. B. Knight.

Inventor:
Henry R. Corkhill, Sr.
By E. B. Whitmore, Atty.

(No Model.)   H. R. CORKHILL, Sr.   12 Sheets—Sheet 9.
PAPER BAG MACHINE.

No. 361,746.   Patented Apr. 26, 1887.

Attest:
C. B. Nash,
H. B. Knight.

Inventor:
Henry R. Corkhill, Sr.
By E. B. Whitmore, Atty.

(No Model.)  12 Sheets—Sheet 10.
H. R. CORKHILL, Sr.
PAPER BAG MACHINE.

No. 361,746. Patented Apr. 26, 1887.

(No Model.)  12 Sheets—Sheet 11.
H. R. CORKHILL, Sr.
PAPER BAG MACHINE.
No. 361,746.  Patented Apr. 26, 1887.
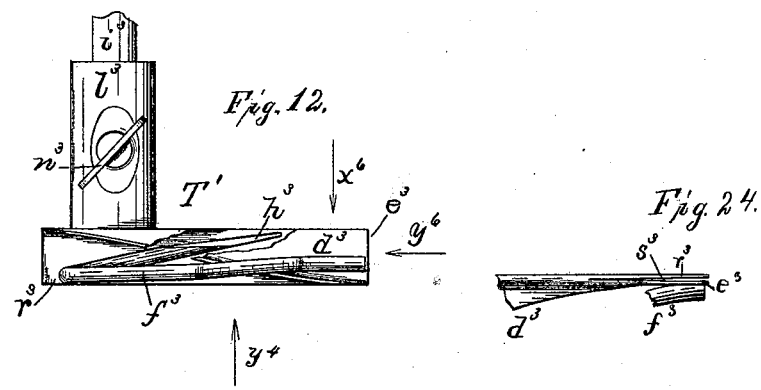
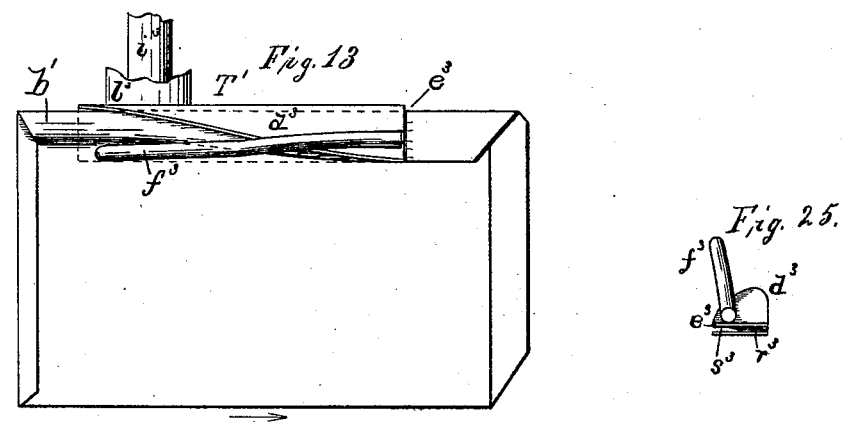
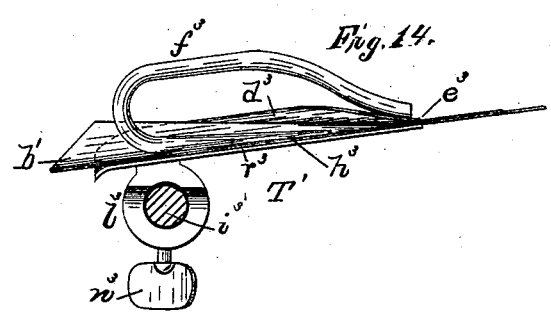

(No Model.) 12 Sheets—Sheet 12.
H. R. CORKHILL, Sr.
PAPER BAG MACHINE.

No. 361,746. Patented Apr. 26, 1887.

UNITED STATES PATENT OFFICE.

HENRY R. CORKHILL, SR., OF ROCHESTER, NEW YORK.

PAPER-BAG MACHINE.

SPECIFICATION forming part of Letters Patent No. 361,746, dated April 26, 1887.

Application filed May 29, 1886. Serial No. 203,583. (No model.)

*To all whom it may concern:*

Be it known that I, HENRY R. CORKHILL, Sr., of Rochester, in the county of Monroe and State of New York, have invented a new and useful Improvement in Paper-Bag Machines, which improvement is fully set forth in the following specification and shown in the accompanying drawings.

In Patent No. 350,974, granted October 19, 1886, I show and describe a machine composed of various devices for feeding and pasting blank sheets of paper cut to a proper form out of which to make paper bags for holding garden-seeds or similar articles.

The invention shown and described in my present application is the major part of the whole machine to which the part shown in said application belongs and forms an integral part. The part of the machine herein described folds the sheets, does the final pasting, and "irons" the bags, besides delivering them complete conveniently for handling, said part of the machine being fully described hereinbelow, and more particularly pointed out in the claims.

Figure 1:
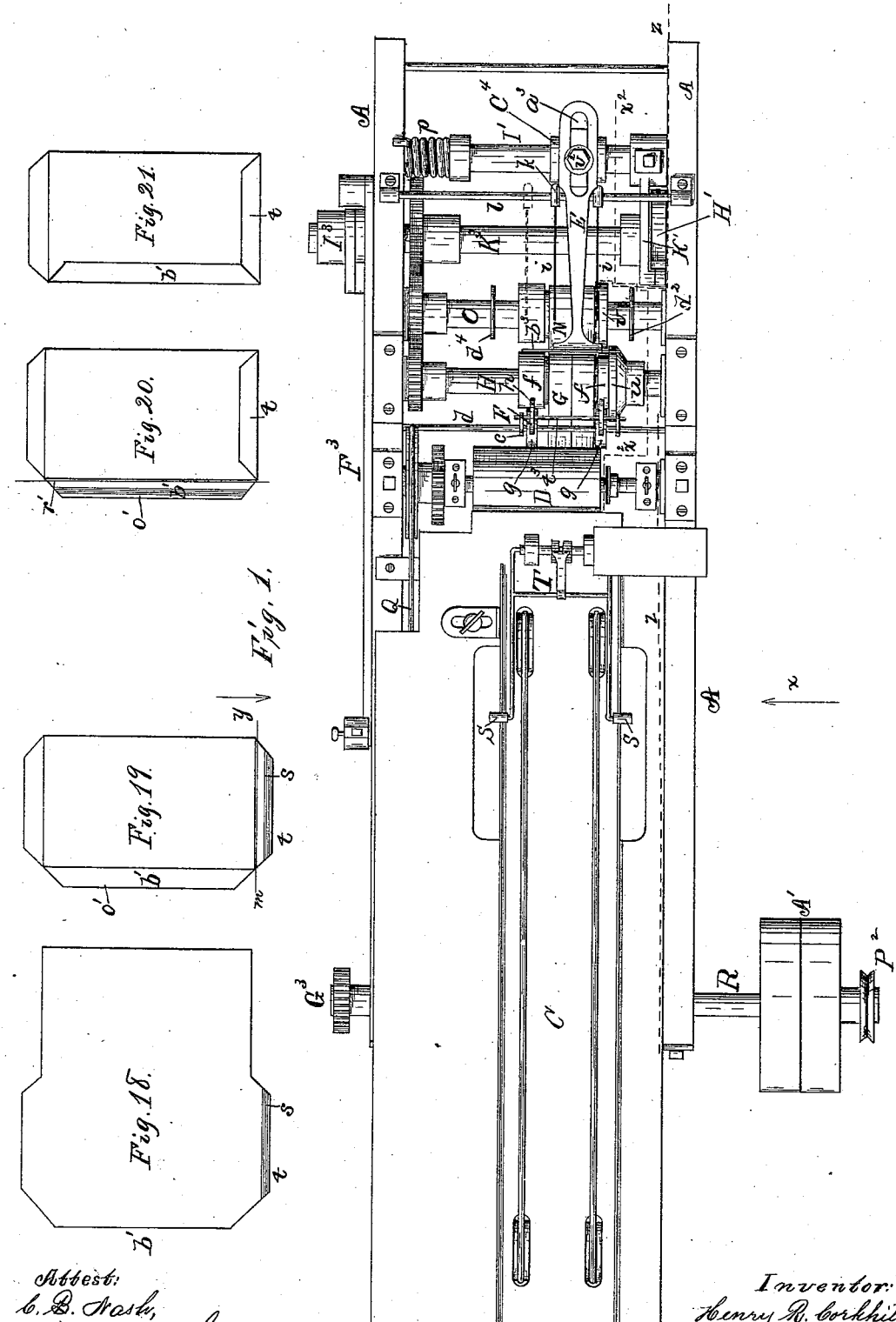
Figure 2:
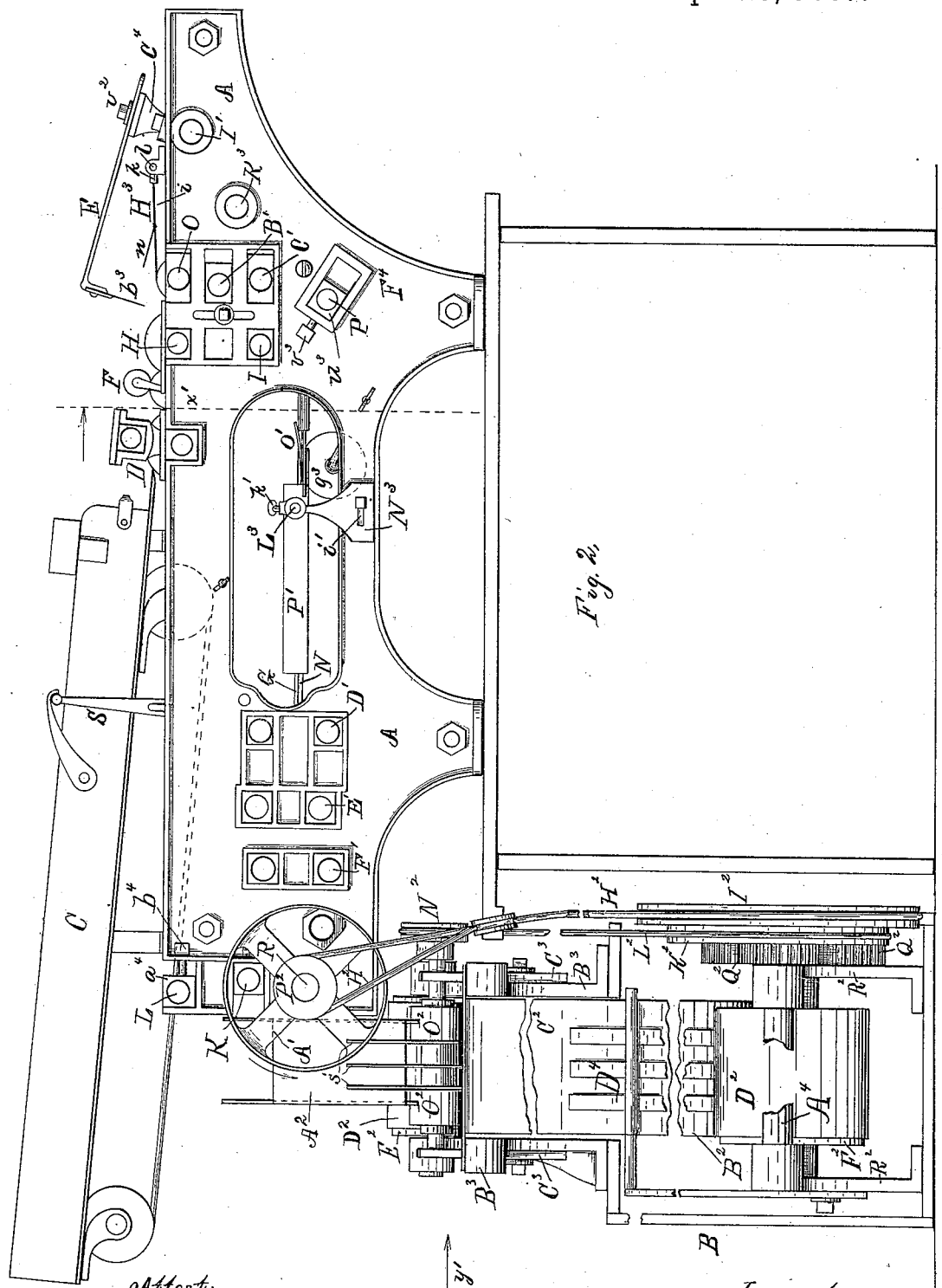
Figure 3:
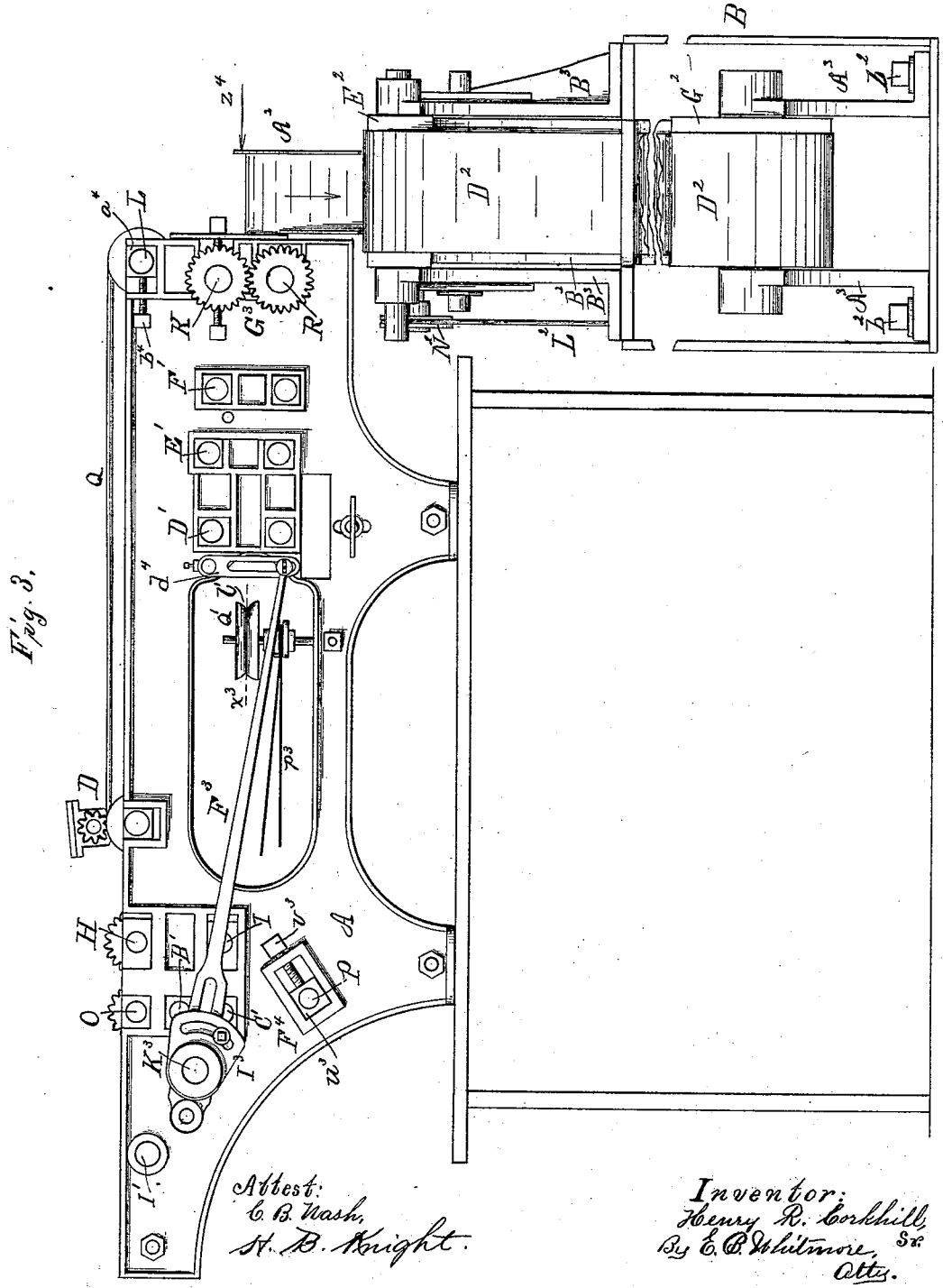
Figure 4:
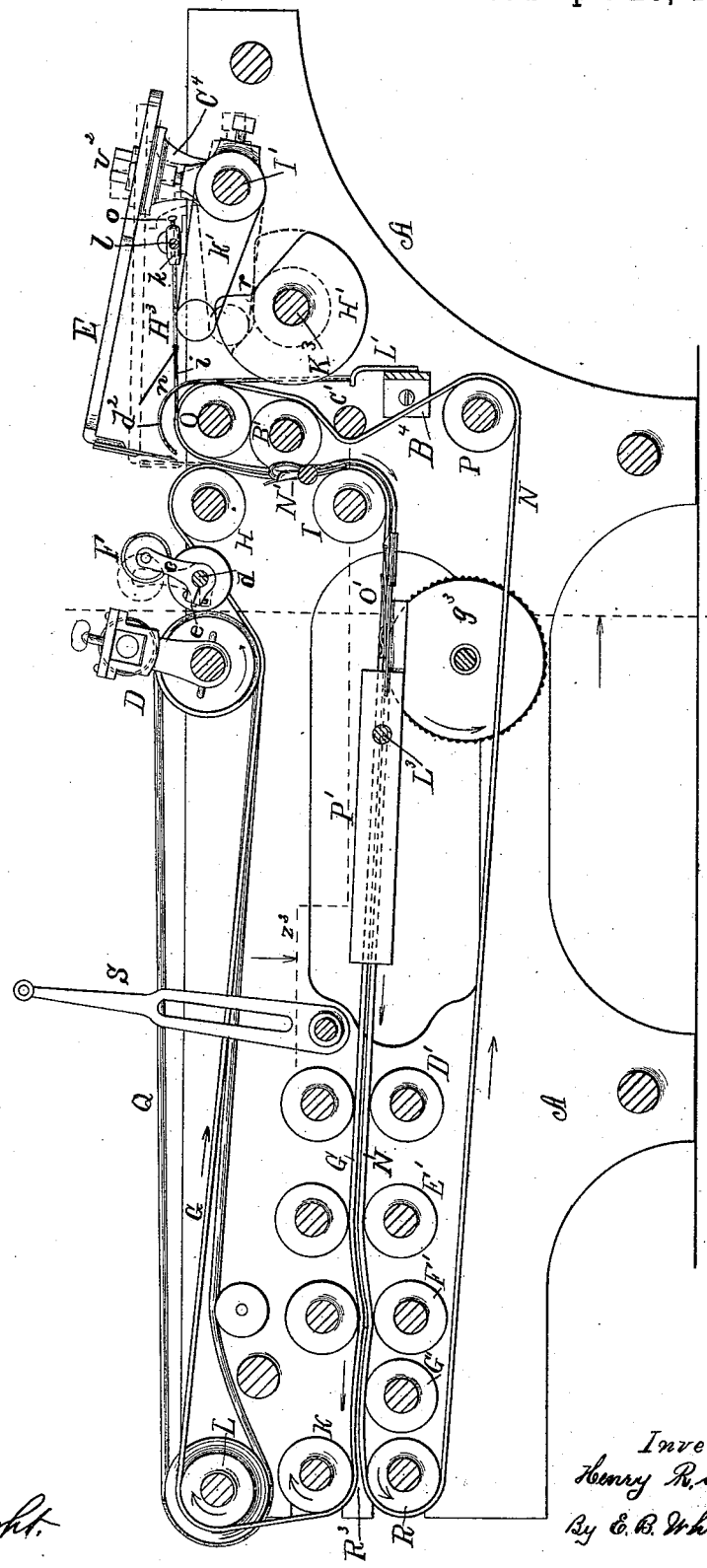
Figure 5:
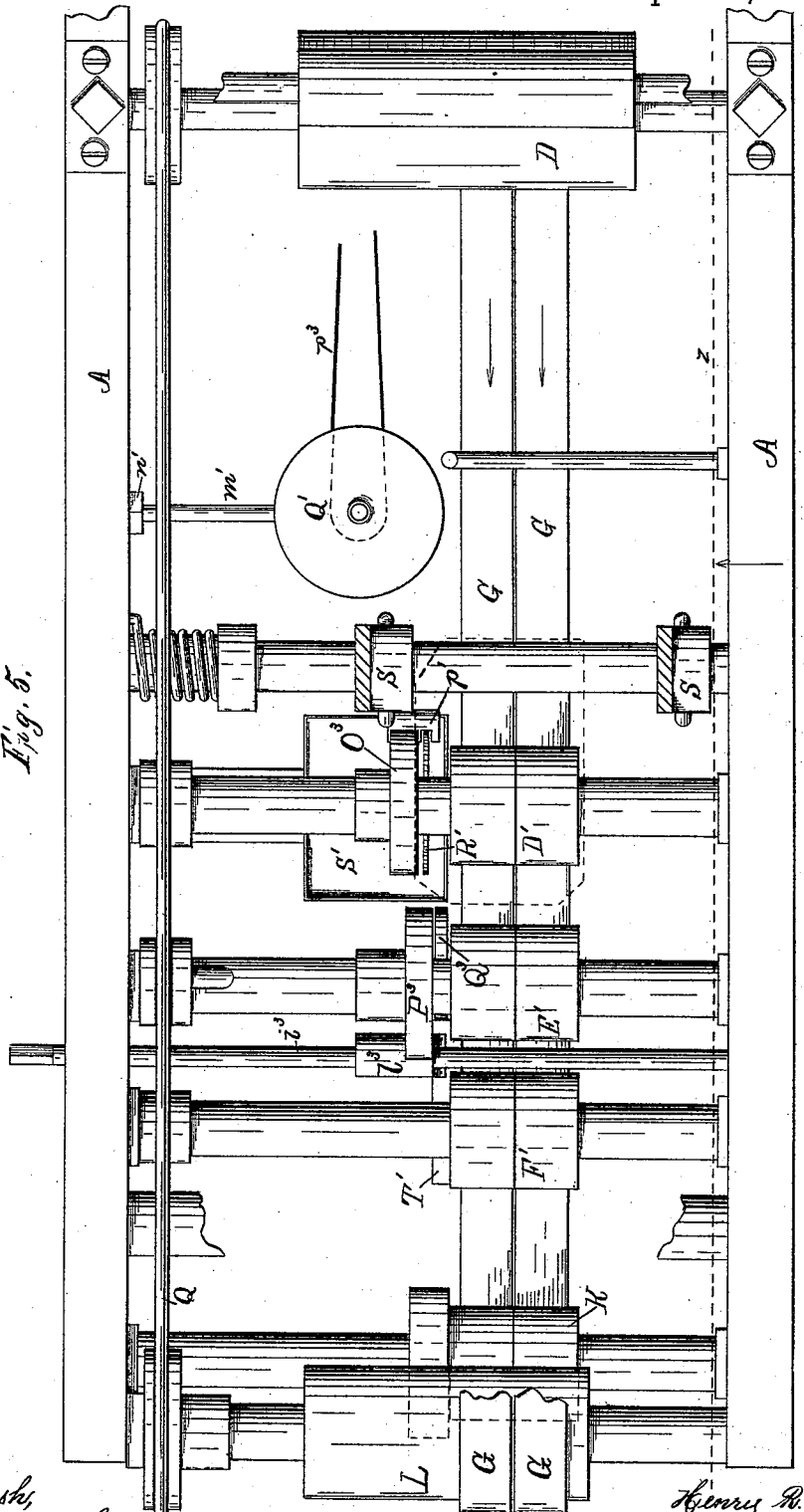
Figure 6:
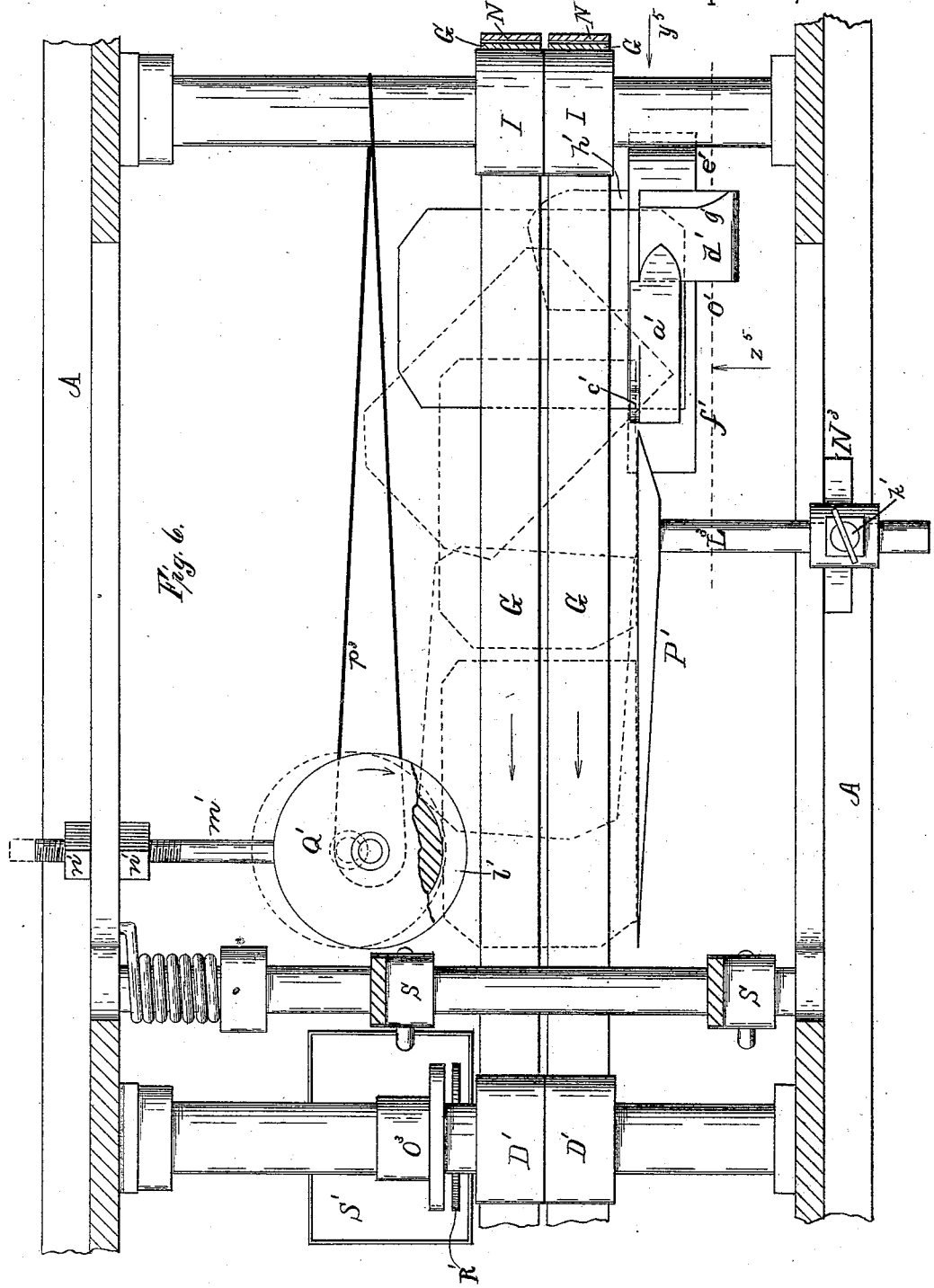
Figure 7:
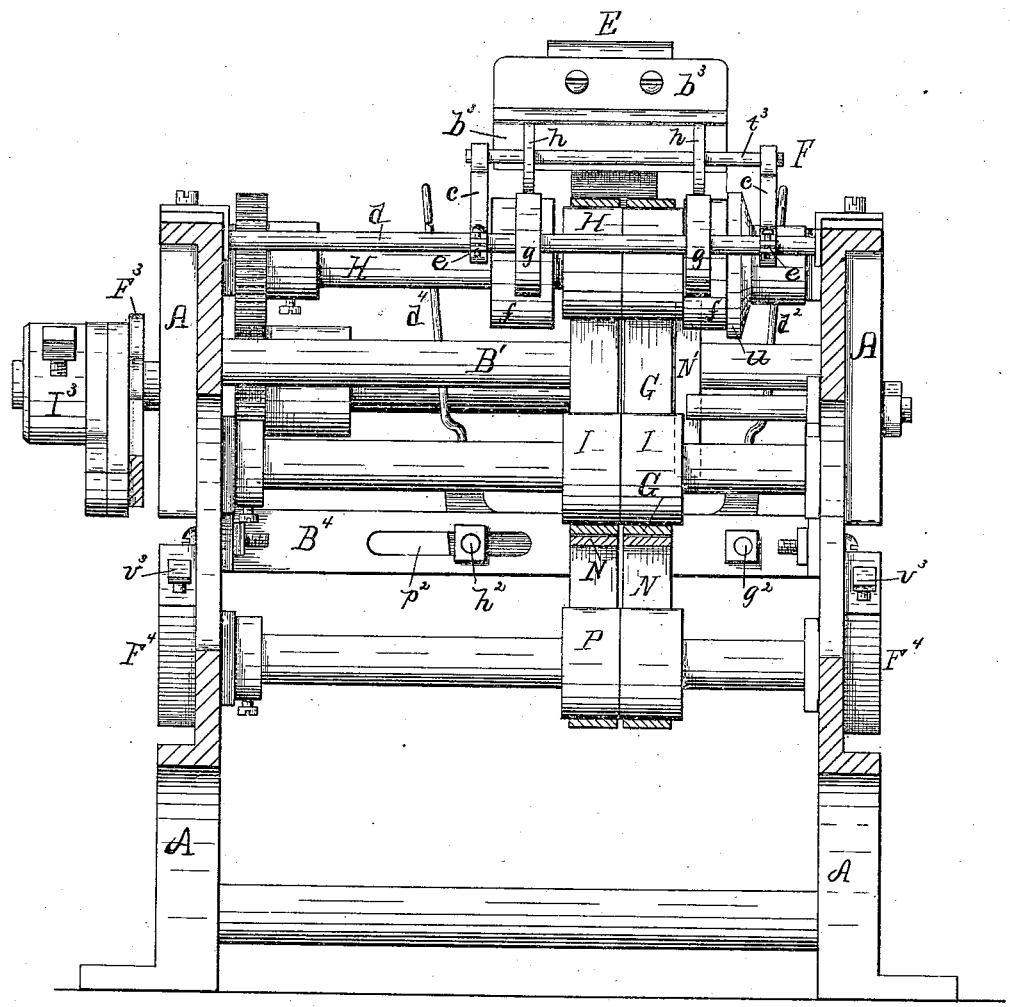
Figure 8:
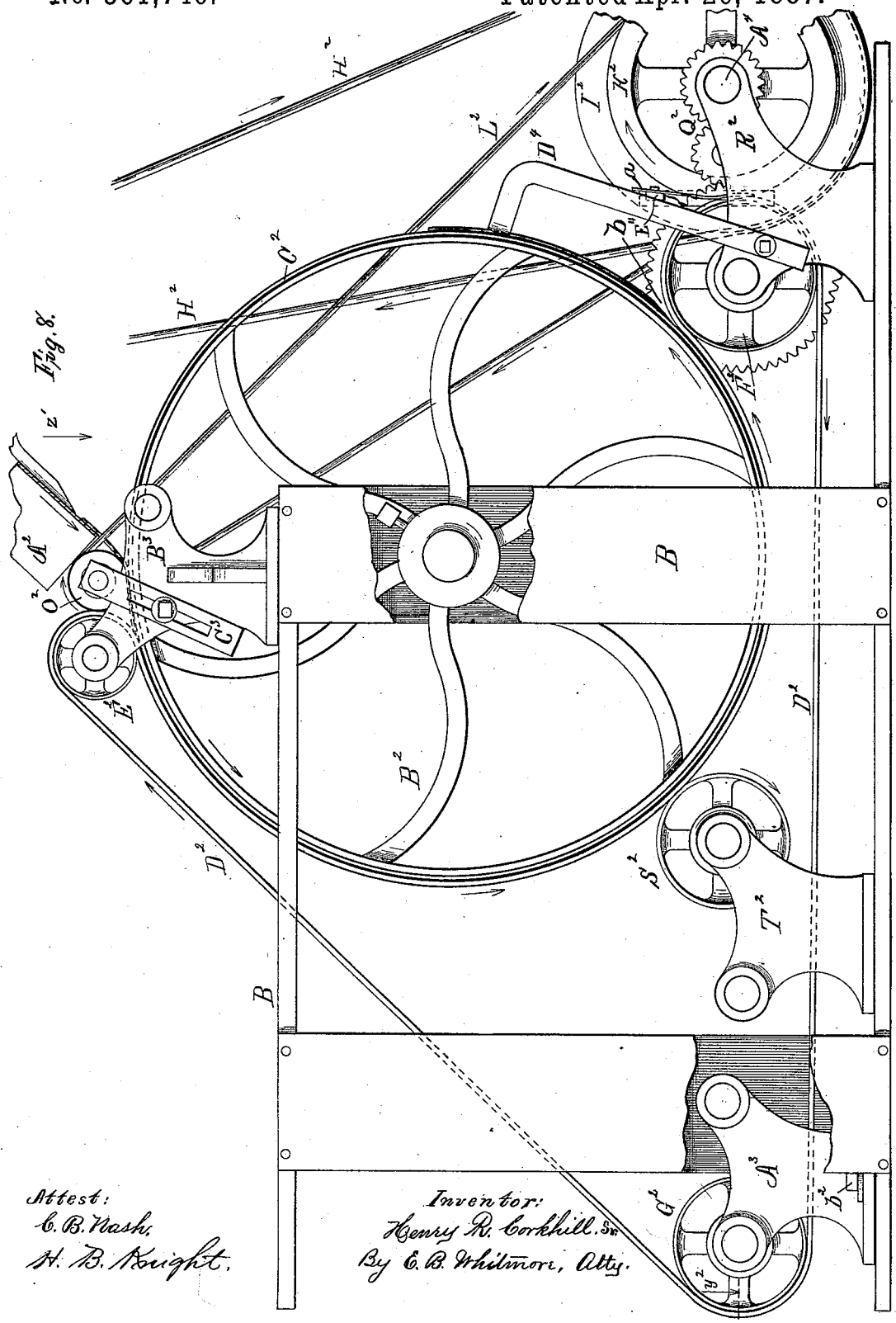
Figure 9:
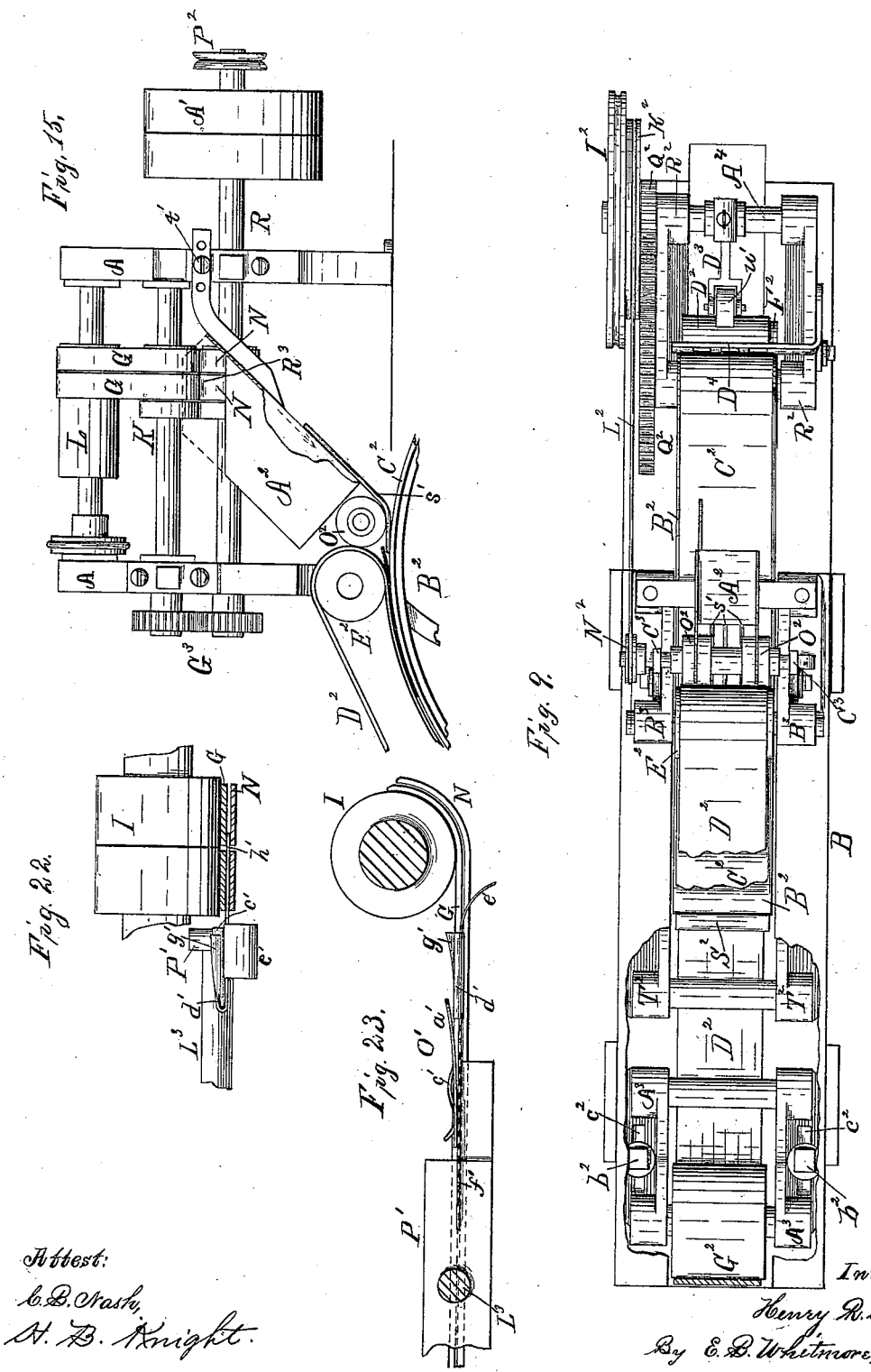
Figure 10:
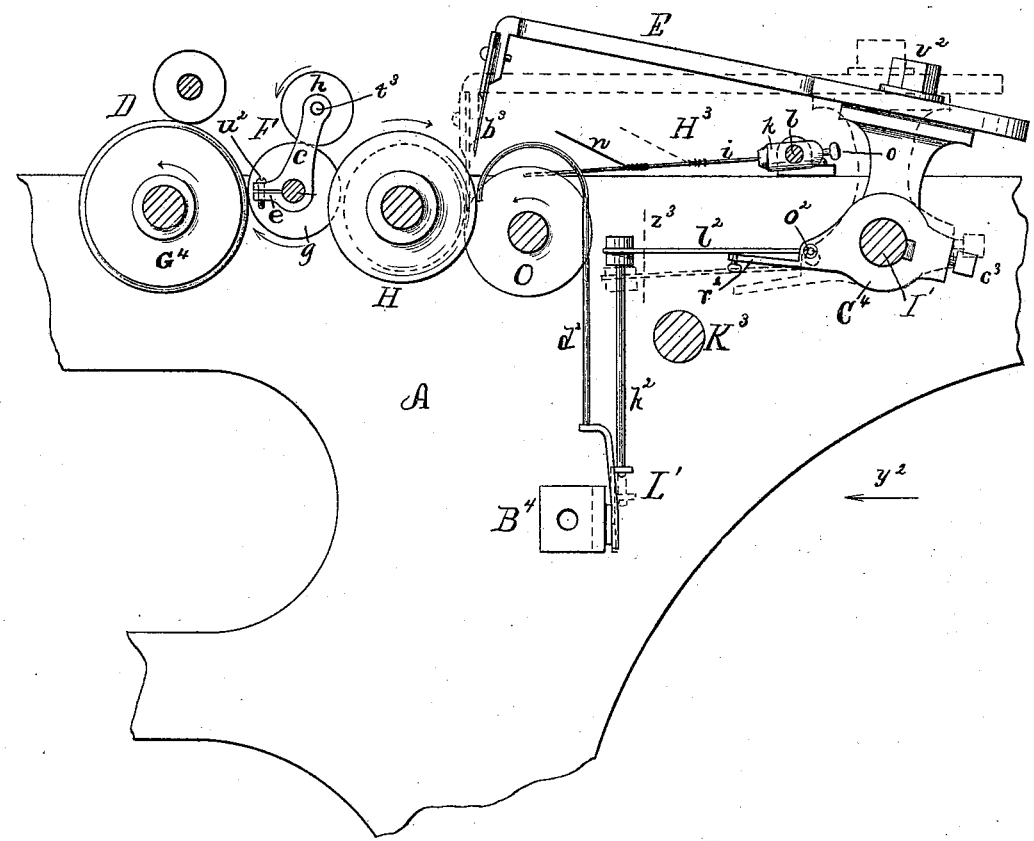
Figure 11:
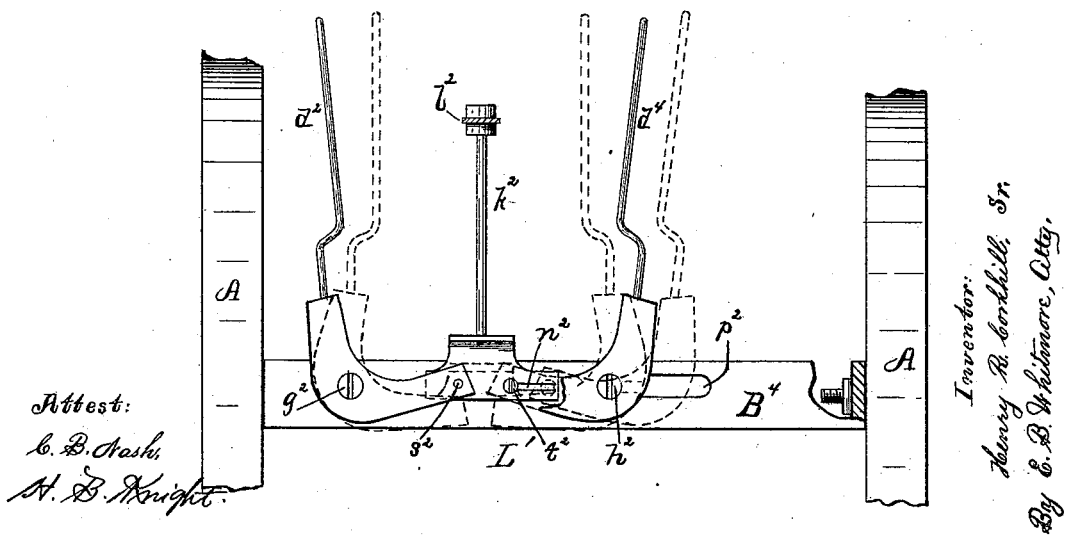
Figure 16:
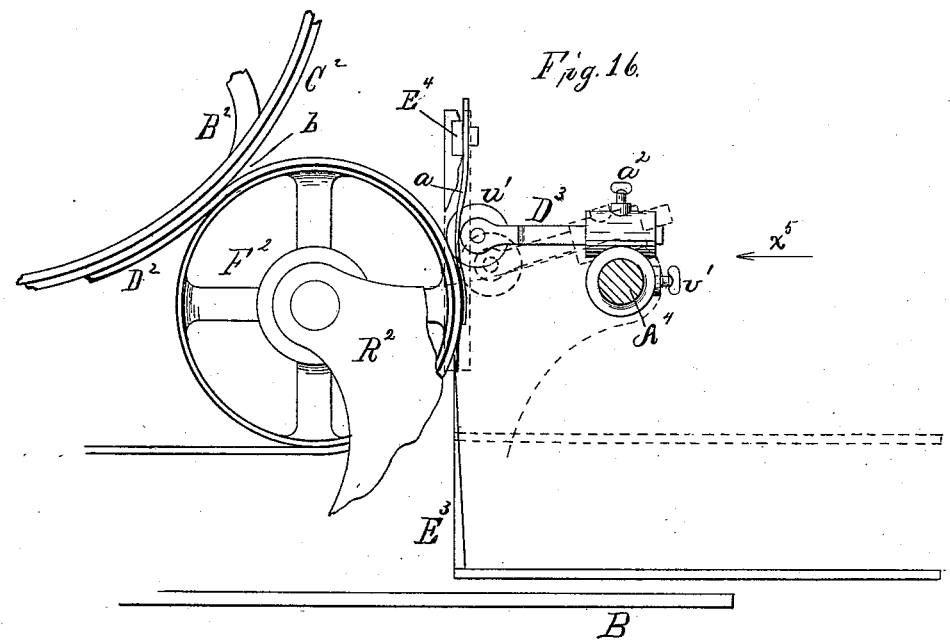
Figure 17:
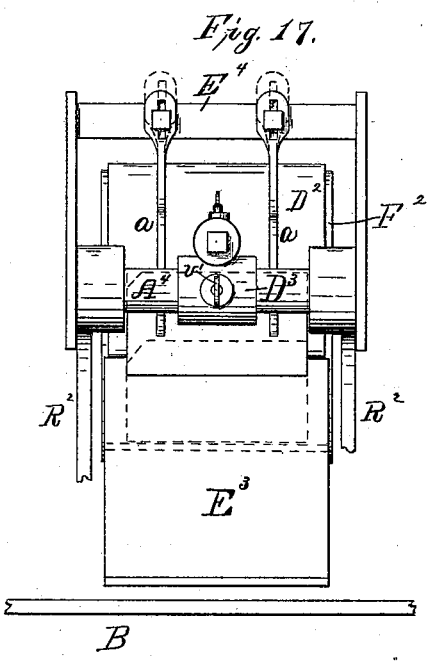

Referring to the drawings, Figure 1 is a plan of the upper part of the machine now sought to be patented, some of the parts being shown that appear in my previous application above mentioned; Fig. 2, a side elevation of the same viewed in the direction indicated by arrow $x$ in Fig. 1, the lower part of the machine being shown, but broken and condensed to bring the drawings within the limits of the sheet; Fig. 3, a view of the machine from the other side, as indicated by arrow $y$ in Fig. 1, the rear part being condensed, as in Fig. 2; Fig. 4, a side sectional elevation of the machine drawn to a larger scale, sectioned as on the dotted line $z$ in Figs. 1 and 5, and viewed as indicated by arrow $x$ in Fig. 1, drawn to more fully show the arrangement of the carrying-belts and other parts within the frame; Fig. 5, a plan of the parts of the machine back of the feeding-rolls, drawn to a larger scale than that to which Fig. 4 is drawn, the feed-spout and cover being omitted to expose to view the parts beneath and within the frame, the arms that drive the feeder being horizontally sectioned, as on the dotted line $z^2$ in Fig. 4, and other parts broken away and omitted. Fig. 6, drawn to a still larger scale, is a plan of parts at the middle of the machine beneath the feed-rollers, drawn to show the manner in which the incomplete bag is turned one-fourth around horizontally to receive the final paste and fold, the arms that drive the feeder and the carrying-belts being horizontally sectioned, as on said dotted line $z^2$, and the adjusting-roller sectioned in part, as on the dotted line $x^3$ in Fig. 3, and other parts broken away, a bag shown in various positions in dotted lines in the act of turning; Fig. 7, a transverse vertical section of the machine, taken as on the dotted line $x'$ in Fig 2, viewed as indicated by the arrow pointed thereon, drawn to a larger scale to more fully show some of the interior parts of the machine in front of and below the feed-rollers; Fig. 8, a view taken at the rear of the machine, (indicated by arrow $y'$, in Fig. 2,) drawn to a larger scale to more fully show the devices used to iron and dry the bags, parts being broken away and the chute longitudinally sectioned. Fig. 9, drawn to a scale less than that to which Fig. 8 is drawn, is a view of the parts shown in said Fig. 8, (seen as indicated by arrow $z'$,) the lapping-belt being sectioned, as on the dotted line $y^2$ in Fig. 8, and other parts broken away; Fig. 10, a vertical sectional view, drawn to a larger scale, of some of the parts forward of the feed-rollers, (seen in the direction in which Fig. 4 is seen,) the section being taken as on the dotted line $x^2$ in Fig. 1, the figure being drawn to show the form and operation of the device for centering the sheets before being struck by the breaker, parts being shown in two positions by full and dotted lines; Fig. 11, a view of the parts of the centering device shown in Fig. 10, (seen as indicated by arrow $y^2$ in said latter figure,) serving to more fully show the form and manner of operation of the same, the centering-fingers being shown in various positions by full and dotted lines, the operating-lever being transversely sectioned, as on the dotted line $z^3$ in Fig. 10, near the vertical lifting-rod. Fig. 12 shows the tucker for folding the edge of the sheet after pasting, part of the spiral plate being broken away to show the point of the creaser, the view being taken from beneath, or in an opposite direction from that in which Figs. 5 and 6 are seen; Fig. 13, a similar view of the same, showing in addition thereto a partially-formed bag in the act of passing through to have the fly turned and laid; Fig. 14, a view of the tucker, (seen as indicated by arrow $y^4$ in Fig. 12;) Fig. 15, Sheet 9, a rear elevation of the upper part of the machine with parts omitted (viewed as indicated by arrow $z^4$ in Fig. 3,) drawn to show the chute down which the incomplete bags slide to the ironer, the side of the chute nearest the observer being mostly broken away; Fig. 16, Sheet 12, a view of the part of the machine at which the completed bags are delivered into a tray or receptacle, (seen in the direction in which Fig. 8 is seen,) drawn to a larger scale than that to which said Fig. 8 is drawn, showing the detention-springs and presser which serve to hold the bags upon the belt in a manner to insure their orderly delivery to the receptacle, parts being omitted and broken away and other parts shown in two positions by full and dotted lines; Fig. 17, a view of the same parts, (seen as indicated by arrow $x^5$ in Fig. 16,) drawn to further show the manner in which the bags are finally acted upon in the operation of delivery. Figs. 18, 19, 20, and 21, Sheet 1, show the progressive forms given the sheet during the process of forming a bag; Fig. 22, Sheet 9, a view of the turner, (seen as indicated by arrow $y^5$ in Fig. 6,) with parts of the adjacent drum I; Fig. 23, a view of the same parts (seen as indicated by arrow $z^5$ in said Fig. 6,) drawn to further show the form of the parts of said turner; Fig. 24, Sheet 11, a view of part of the tucker, (seen as indicated by arrow $x^6$ in Fig. 12,) drawn to show the slit that divides the opposing plates; and Fig. 25, a view of the same, (seen as indicated by arrow $y^6$.)

Referring to the parts, A is the frame of the upper part of the machine, and B the frame for the rear part thereof.

C is the feed-spout for holding the blank sheets of paper, and D the feed-rollers that carry the sheets forward to the breaker E, said feed rollers and spout being shown and described in Patent No. 350,974, above mentioned.

F are carrying-rollers or carriers for the sheets between said feed-rollers and breaker.

$H^3$ is a stop for the sheets, against which the latter are carried by the rollers F.

G are the upper companion carrying-belts for the folded sheets, held upon drums H and I, forward of the feed-rollers, and similar drums, K L, at the rear of the machine, said belts being driven by the drum K in a manner described farther on.

N are similar under opposing companion carrying-belts, facing and co-operating with the belts G to carry the folded sheets to the rear of the machine, said belts N being held upon drums O P, near the forward end of the frame, and a driving drum or shaft; R, at the rear of the frame, said belts also bending around the drum I outside of the belts G.

Q is a belt for driving the feed-rollers D, and S are reciprocating arms for carrying the feeder T, which arms, feeder, belt, and various other parts, being shown and fully described in said patent, are shown here in but few of the figures.

A' are belt-pulleys on the shaft R, from which, by means of an ordinary belt leading from a driving-pulley, all parts of the machine are driven.

B', C', D', E', F', and G' are a series of deflecting-rollers bearing upon the various sides of the adjacent belts G and N, giving to them a sinuous form between the drums H O and K R, where the unfinished bags are delivered to the ironer.

H' is a cam for operating the breaker.

I' is the shaft upon which the breaker is mounted, and K' a rigid arm reaching out from said shaft and bearing upon said cam.

L' is a centering device for the sheets, which centers them or brings them in proper position before being struck by the breaker.

N' is the first tucker passed by the sheets after being struck by the breaker and seized by the carrying-belts, which tucker serves to turn or fold the edge of the sheet forming the bottom of the bag, said edge or fly having been previously supplied with paste as the sheet passed through the feed-rollers D by the process shown and described in the patent mentioned above.

O' is a device for turning the folded sheet in position to receive the paste upon its remaining edge or fly, which is to form a side of the bag when completed.

P' is a guide, which, acting conjointly with the turned and the adjusting or guide roller Q', serves to bring the sheet, after being turned, into position to receive the paste.

R' is the pasting-wheel for delivering a line of paste upon said fly of the sheet, the paste being held in a tray, S', into which the pasting-wheel dips.

T' is a second tucker passed by the incomplete bag, which turns or folds the edge of the latter, said edge or fly being supplied with paste by the wheel R', just mentioned.

$A^2$ is a chute, down which the bags pass to the ironer to be completed; $B^2$, the ironing-wheel, having its face covered with a fibrous covering, preferably a canvas belt, $C^2$.

$D^2$ is a belt passing around pulleys $E^2$, $F^2$, and $G^2$, the pulleys $E^2$ and $F^2$ being placed on nearly opposite sides of the wheel $B^2$ and near to the face thereof, for the purpose of holding said belt against said covering of the wheel. The chute $A^2$ carries the bags under the belt and between it and said covering for the wheel. The belt and wheel $B^2$ are driven by a belt, $H^2$, running upon a driving-pulley, $P^2$, on the driving-shaft R, and upon a large pulley, $I^2$, which latter is connected with the pulley $F^2$ by a train, $Q^2$, of toothed wheels. The wheels $I^2$ and $F^2$ are held by a standard, $R^2$, and the wheels $S^2$, $G^2$, and $E^2$ are held by standards $T^2$, $A^3$, and $B^3$. The bags passing down the chute $A^2$ are caught by a rapidly-revolving roller, $O^2$, which serves to urge each bag as it arrives quickly under the belt D², out of the way of the bag next following, and in a manner to lay the folded fly flat against the bag. The roller O² rests in adjustable bearings C³, secured to the standard B³, and is rotated by means of a belt, L², running upon the pulley K², rigid with the pulley I², and the pulley N² at the outer end of said roller O². The lapping or ironing belt D², from the position of the pulleys E² and F², is held firmly against the covering of the wheel B², and as the bags are carried between said belt and covering they are firmly pressed and flattened, having the wrinkles taken out of them and the pasted laps held firmly down during a sufficient time to cause them to adhere. When the bags are released at b, they are smooth and straight from this compressing or ironing process and ready to pack into packages or boxes for shipment. After the bags are released at b by emerging from between the belt D² and the wheel, they are carried on for a short distance upon said belt, over the wheel F², under the ends of slender detaining-springs a and compressing-bar D³, from which they are delivered into a tray or receptacle, E³, edgewise and in order.

S² is a compressing or ironing wheel held to press firmly against the belt D² to bring a greater pressure upon the bags as they pass through, several of which wheels may be used, if found necessary, to press said belt at points between the pulleys E² and F², or all may be dispensed with in cases when not needed. The wheel S² is held by a standard, T², secured to the frame B.

F³ is a connecting-rod reaching from a cam, I³, upon the outer end of the shaft K³, to a rocker-arm, d⁴, for operating the feed, all of which parts are shown and fully described in the patent above mentioned.

The drum K, that drives the upper carrying-belts, G, for the bags, is given positive motion from the driving-shaft R by means of gears G³ on the opposite side of the frame, Figs. 1 and 3.

The lower rollers, g, of the set of carrying-rollers F turn upon a transverse shaft, d, held rigidly to the frame A, and are turned in the direction indicated in Fig. 10 by bearing against the lower feed-roller, G⁴, which roller, as described in said Patent No. 350,974,(lettered F) turns in a direction contrary to that in which the blanks move. (Indicated by arrow.) The upper rollers, h, of said set of rollers are turned by bearing against the respective opposing lower rollers, g. These several rollers catch the sheets of paper as they pass the feed-rollers D and carry them safely under the breaker E and against the adjustable stops H³, said stops consisting of rods i, beneath the sheets, provided with heads k, secured to a transverse shaft, l, held rigidly to the frame A, and tines n, secured to said respective rods. The heads k are fitted to slide laterally along the shaft l for the purpose of being adjusted to sheets of different widths, and are held in the various positions of adjustment by set-screws o, and the tines n are secured to the rods i so as to be adjusted thereon toward or from the rollers F, for the purpose of stopping the sheets in position to be struck by the breaker E at the exact lines at which they are to be folded.

The shaft I', which carries the breaker, is actuated by a spiral spring, p, Fig. 1, wound thereon, having a bearing upon the frame, the tendency of which spring is to turn the shaft to throw the breaker downward. The cam H' is formed with a notch, r, into which the arm K' is forced by the spring p when said notch is presented by the rotation of the shaft K³. The sudden dropping of the arm into the notch of the cam allows the breaker to descend and strike the sheet of paper beneath it a quick blow, driving the same doubled between the carrying-belts G and N, above described. The sheet, when thus doubled from the blow of the breaker, is in the form shown in Fig. 19, the sheet being originally cut to the form shown in Fig. 18. In passing through the feed-rollers, the edge or fly t of the sheet receives a line of paste, s, by the pasting device set forth in the patent above mentioned, and in passing down between the belts G and N, after being acted upon by the breaker, said fly is creased along the line m, at which it is to bend when subsequently folded by passing between the slightly-overlapping enlarged parts u and v of the drums H and O. The action of said parts u and v upon the paper is detrusive; but the parts stand a little asunder, so that the paper is not sheared or cut. In its onward course the sheet passes the first tucker, N', which turns the fly t completely over, bringing the pasted part snugly down upon the side or face of the bag in the manner shown on Sheet 11, save that the tucker there shown is the second one encountered by the sheet and works left handed to turn the long fly b' of the same. Both tuckers N' and T' are constructed and operate exactly alike, save that one turns to the right and the other to the left—a circumstance rendered necessary from the manner in which the forming bag presents itself to them.

After passing the first tucker it becomes necessary to turn the partially-formed bag one-fourth around in a horizontal plane to bring it in position to receive the second line of paste at R' and to pass the tucker T'. This is effected by the turner O'. (More fully shown in Sheets 6 and 9.) This turner, which is rigid with the guide P', is, with the latter, held at the side of the carrying-belts by a rod, L³, and holder N³, the latter being secured adjustably to the frame A in position to have the end of the bag just folded and pasted pass under the guide d' and tongue or catch a', where it is caught and gently held at the left front corner, while the advancing belts carry forward the unrestrained end of the bag, causing it to turn, as indicated by the dotted positions. A slender detent-spring, c', secured to the tongue a', serves to further hold the bag against the action of the carrying-belts, for the purpose of insuring the swinging of said bag fairly around against the guide P', and when thus swung to place the moving belts draw the bag from the bite of the spring. The downwardly-curved end $e'$ of the plate $f'$ of the turner and the upwardly-turned edge $g'$ of the guide $d'$ cause the edges of the bags as they approach the turner to certainly pass under the tongue $a'$, as above stated.

A thin wing, $h'$, extends laterally outward from the plate $f'$ between the upper and lower carrying-belts, G and N, being employed for the purpose of causing the bag to be carried smoothly around, as above described, serving to prevent the newly turned and pasted lap, which is yet moist and frail, from being torn up from fraying or rubbing across said lower belts in the act of turning. The bag moves around on the upper surface of the wing and has at this point its newly-formed lap (formed by the folded fly $t$) for the first time brought between the upper and lower carrying belts, which serve to hold said lap firmly down against the bag. The turner O' and guide P' are longitudinally adjustable on account of the holder $N^3$ being formed with a slot, $i'$, through which the fastening-bolt passes, and said parts O' and P' are laterally adjustable from the fact that the rod $L^3$ is fitted to slide through the holder $N^3$, the same being held in positions of adjustment by a set-screw, $k'$. To further assist to turn the bags I employ a notched circular disk, $g^3$, turning on a horizontal axis, said disk reaching up between the lower carrying-belts, N, to press against the under surface of the bag. This disk is turned simply by the friction of the belts and advancing bag, but it serves to crowd the bag more firmly against the upper belts, and, increasing the friction between said upper belts and bag, the latter is more certainly carried around, as above described. The disk also further serves to assist to urge the bag onward away from the detent-spring, which latter slightly pinches the bag, and thus acts to detain it against the action of the advancing belts.

To further insure the bag to be moved truly along to the pasting-wheel R', I supply a guide or adjusting roller, Q', formed with a peripheral groove, $l'$, and held in position to receive and turn the forward end of the bag truly against the guide P', should it by chance stand a little way therefrom, as shown in Fig. 6. This roller is very light and fitted to turn freely upon its holder or stem $m'$, which latter is threaded and passed through a part of the frame A, being provided with pinch-nuts $n'$, by which it may be adjusted in directions toward or from the belts. The roller Q' is turned by a cord, $p^3$, leading from the drum I. After passing the roller Q', the remaining fly, $b'$, of the bag passes truly over the edge of the pasting-wheel R', and receives a second line of paste, $o'$, thereon. A collar, $O^3$, upon the shaft of the drum D', over the pasting-wheel, runs near the periphery of said wheel and serves to hold the fly gently down upon the edge thereof, the edge of said fly passing under the collar, as indicated in Fig. 5. The wheel R' has its lower edge immersed in the paste of the tray S', a simple stripper, $p'$, serving to remove the surplus paste therefrom.

$P^3$ and $Q^3$ are a second pair of creasers similar to the ones shown at $u$ and $v$, above mentioned, for creasing the paper of the fly $b'$ along the line $r'$, at which said fly is to be folded by the second tucker, T'. (See Sheet 11.) The tucker T', forming the final lap by folding the fly $b'$, completes the bag as to form, it requiring thereafter only ironing, which completes the bag by taking out the wrinkles and smoothing the same, pressing the folded edges or laps firmly down against the side or face of the bag, and drying the latter sufficiently to cause the pasted joints to be firm and strong.

The bags are delivered from the carrying-belts at $R^3$, and fall into the chute $A^2$, which conveys them to the surface of the ironing-wheel $B^2$, where they glide under the lapping-belt $D^2$, being firmly compressed between said belt and the covered surface of the wheel. The wheel is of comparatively large diameter and is turned slowly by the belt $D^2$, so that the bags are held for some time thereon, sufficiently long to firmly set the paste, press the wrinkles out of the paper, and dry the latter sufficiently to cause the pasted joints to be firm.

The lapping-belt $D^2$ is made of canvas or other absorptive material, the face of the wheel being covered by a similar material, which cover and belt are kept moist or damp by a regular supply of water carried thereon by some convenient means, as by a drip or the contact of a dampened surface. This moisture prevents the bags from adhering to said cover or belt on account of the paste pressed out in small quantities from under the laps and accumulating upon their surfaces. It also serves to dampen the entire bag and cause it to iron smooth and be flat. The lapping-belt and face of the wheel are sufficiently broad, so that it is immaterial whether the bags slide in from the chute exactly sidewise or corner first, as in either case they are equally well ironed and compressed. The chute is provided with carrying-wires $s'$, which serve to better carry the bags under the belt, and a roller, $O^2$, rotating at a rate which causes its surface to move more rapidly than the surface of the wheel, serves to catch each bag from the wires and urge it quickly under the belt. The chute is fastened to the frame A by some simple means, as by a screw, $t'$, so as to be adjustable.

When a bag is delivered into the chute from the carrying-belts, its position is such that the two laps are on the under side thereof, and it slides downward to the ironing-wheel substantially edge first, the advance edge being that at which the side lap is made. It frequently occurs that a bag slides down the chute to the ironing-wheel with the side lap not lying flat, but standing away from the bag, having sprung back on account of the elasticity of the paper, the paste at first failing to hold it down, this being particularly the case when thick or heavy stock is used for making the bags. When the lap is thus raised, it is frequently roughly crumpled down by the ironing-wheel and belt instead of being made to lie flat upon the bag, as intended, this occurring from the fact that the covering of the wheel acts against the edge of the lap and crushes it down, as stated. The function of the roller $O^2$ is to urge or drive each bag as it is presented in between the lapping-belt and wheel at a greater rate of speed than that at which said belt and wheel are moving, which prevents the covering of the wheel from acting directly against the edge of the lap, but, on the other hand, causes the opened lap to be wiped or laid back snugly and smoothly against the bag, as in this operation of the parts the pressure between the belt and wheel is first brought to bear upon the line of the bend in the lap, instead of upon the free edge thereof. The roller acts upon the side or face of the bag opposite to that upon which the laps are turned, from the fact that the bag passes under said roller, the laps being also turned toward or against the face of the covering of the wheel.

The springs $a$, pressing lightly against the surface of the lapping-belt where it passes over the drum $F^2$, serves to straighten the bags or bring them in position to lie squarely across said belt and fall or be carried into the receptacle $E^3$ in order, being deposited upon their edges. For instance, if a bag lies askew upon the belt when it approaches the springs, the part farthest in advance will encounter a spring and be retarded, while the other part will be carried forward by the advancing belt, the presser-bar $D^3$ serving to hold the bag gently against the belt, so that it will be driven downward into the receptacle, notwithstanding the action of the springs. The springs are held adjustably to a bar or holder, $E^4$, supported from the standard $R^2$. The presser-bar is held adjustably upon the shaft $A^4$, being secured by a set-screw, $v'$, and provided with a roller, $u'$, to bear upon the belt. It is also constructed to be adjusted longitudinally, the bar being secured by a set-screw, $a^2$, to its holder, by means of which two adjustments the roller may be made to bear higher or lower upon the belt, or press the latter with greater or less force, as may be required.

The standard $A^3$ is held adjustably to the frame, so that it may be moved in directions toward or from the ironing-wheel for the purpose of adjusting the tension of the lapping-belt, being secured to the frame by bolts $b^2$ passing through slots $c^2$.

Before the sheets are struck by the breaker, it is necessary to bring them truly to position over the rolls H and O, carrying the belts G and N. The stop-tines $n$ are accurately adjusted upon the rods $i$ to stop the sheets squarely under the blade of the breaker and in position to cause said sheets to be folded at the right place. It is also necessary to adjust the sheets laterally or in directions at right angles to that in which they approach the stops. This is done by means of the centering device L'. This device consists of centering-fingers $d^2$ and $d^4$, attached to a cross-bar, $B^4$, of the frame by pivot-screws $g^2$ $h^2$, respectively, by means of which said fingers may vibrate or swing in a vertical plane. A connection, $k^2$, is attached to the centering-fingers, which reaches upward and joins an actuating-lever, $l^2$, by means of which said fingers are operated. The lever $l^2$ is secured to the hub $C^4$ of the breaker, so that when the shaft I' turns to carry the breaker down, as above described, the free ends of the fingers are carried toward each other, as indicated by dotted positions. The fingers are held one upon either side of the sheet, at some little distance therefrom, and should the latter be presented for the action of the breaker in a position uncentrical it will be centered or adjusted by the fingers as they are brought toward each other, as stated, said fingers reaching up sufficiently far to bear against the edges thereof. When the shaft I' turns in the opposite direction to raise the breaker, the upper ends of the fingers are caused to move widely apart and out of the way of the succeeding sheet. The connecting-piece $k^2$ is formed with a slot, $n^2$, and the bar $B^4$ is formed with a slot, $p^2$, for the pivot-screw $h^2$, by means of which the finger $d^4$ may be laterally adjusted, so that said fingers may operate upon sheets of different widths in making different-sized bags.

The lever $l^2$ is not rigid with the hub $C^4$, but joined thereto by a pivot, $o^2$, so as to move to a limited extent independently of said hub in a vertical plane. A projection, $r^2$, reaches out under the lever, bearing against the latter at a point between the pivot and the overhanging end thereof, by means of which said lever is lifted positively when the shaft I' is turned to raise the breaker; but when the shaft is turned in the opposite direction said projection moves downward, leaving the lever and connecting-piece $k^2$ to fall from their own weight to bring the fingers toward each other, as above described. The fingers $d^2$ $d^4$ are curved or bent over at the top in parallel vertical planes, the latter being parallel with the line of the movement of the sheet as it approaches the stops, so as to present broader surfaces to the respective edges of the sheets than if they were merely straight wires.

It is sometimes necessary to swing the upper rollers, $h$, of the set F forward or back over the lower rollers, $g$, to adjust them to act upon blanks of different lengths, to accomplish which the hangers $c$ are split at $e$, as above described. By loosening the clamping-screws $u^2$, said hangers may be turned upon the shaft $d$ to bring the rollers $h$ in any desired position of adjustment, either forward or back.

The breaker E is formed with a slot, $a^3$, through which the clamping-screw $v^2$ passes, so that it may be adjusted to cause the blade $b^3$ to strike fairly between the belts G and N to drive the sheets fairly therebetween. A set-screw, $c^3$, in the hub $C^4$ of the breaker serves to secure said hub to the shaft I' in different positions of adjustment of the breaker, either laterally along the shaft or as to the depth to which the blade shall strike between the carrying belts or drums.

The axis of the roller B', as seen in Fig. 4, is nearer the vertical plane passing through the axes of the drums H and I than the axis of the drum O is, which causes the carrying-belts G and N to bend or bow to the left between said drums H and I, and as the belts pass around the latter drum they curve in the opposite direction. The axes of the lower rollers of the pairs D', E', and F' and of the roller G' and drum R below the belts are not in the same horizontal plane. Likewise the axes of the upper rollers of said pairs and of the drum K above the belts are not in the same plane, on account of which the belts are situated, as shown. This crooking of the belts causes the sheets of paper or bags as they are carried along to be bent into ridges or waves, which serves to prevent their swinging one way or the other between the belts as they move forward. Were the belts in straight lines from the drums H and O to the drum I, and from the latter to the drums K and R, there would be danger that the sheets or partially-formed bags would become hitched or turned around one way or the other—as with a swivel movement—to a greater or less extent from the inequalities of the belts, from a lack of an absolute uniformity of motion of the latter at all times, and from other causes, causing the folding of the sheets to be irregular and the work imperfectly done. While they are waved or sinuated, they are prevented from swinging around between the belts, but move along in comparatively true lines until they are delivered to the chute $A^2$.

The tuckers T' and N' are of simple form, being composed of a straight rectangular plate, $r^3$, and spiral plate $d^3$, the two being preferably formed by folding a single piece of metal. At the end $e^3$ of the tucker the plates are parallel and opposed to each other, being slightly separated to allow a lap of the bag to pass through, as indicated, they serving to lay said lap smoothly down. The side fly, $b'$, of the bag, as the latter is carried along, passes under the spiral plate $d^3$ and between it and the plate $r^3$, which folds it and lays it in place, as indicated in Fig. 13. A bent creaser or tongue, $f^3$, is secured to the spiral plate $d^3$, having its reduced free end $h^3$ turned back under said spiral plate and between the two plates to a point near the line of junction between said plates, which creaser sharply marks the fly $b'$ along the line $r'$, as stated, as the bags pass through. The fly is previously supplied with paste, and the creaser causes it to bend or fold along a straight line, forming a straight edge for the bag and a smooth even lap. At the end $e^3$ the plates $d^3$ and $r^3$ are divided by a slit, $s^3$, as shown in Fig. 24. This allows the end to open and close to pass bags of different thicknesses through, the plates exerting a yielding or spring pressure against the opposite sides of the bag.

As above stated, the tuckers T' and N' are alike as to form, but, as a matter of convenience, are made to work one to the right and the other to the left, this being necessary on account of the manner in which the folding has to be done.

The rollers $h$ are fitted loosely upon the shaft $t^3$, so they may rise and fall slightly as a sheet is passed through, they resting upon the sheet simply from their own weight, serving to hold the same gently down upon the opposing rollers $g$.

The drum P is held at its ends in bearings $u^3$, fitted to slide in inclined ways $F^4$ in the frame A, and set-screws $v^3$, passing through parts, respectively, of said ways and bearing against said respective bearings $u^3$, serve to press the roller downward and to the right, as seen in Fig. 2, for instance, for the purpose of properly straining the carrying-belt N.

The drum L rests in similar adjustable bearings, $a^4$, in the frame, and set-screws $b^4$ serve to crowd the same outward for the purpose of straining or tightening the carrying-belt G.

What I claim as my invention is—

1. The carrying-belts of a paper-bag machine, with the drums H, O, and I and the drums R and K, for holding said belts, in combination with a tucker placed between said rollers H O and the roller I, and a turner, paster, and tucker placed between said roller I and said rollers R and K, substantially as shown.

2. In combination with the opposing carrying-belts of a paper-bag machine, longitudinal guide P', and supporting-plate $f'$, the tongue or catch $a'$, to temporarily stop one end of the advancing bag, as and for the purpose set forth.

3. In combination with the opposing carrying-belts of a paper-bag machine, longitudinal guide P', and supporting-plate $f'$, the tongue or catch $a'$ and the detent $c'$, as described.

4. In combination with the upper and lower carrying-belts, the supporting-plate $f'$, provided with a wing, $h'$, dividing said upper and lower belts, and the catch $a'$, substantially as set forth.

5. In combination with the carrying-belts, the guide P', the catch $a'$, with the supporting plate or holder $f'$ for said catch, and the device $g^3$, for urging the bag along, substantially as shown and described.

6. In combination with the shaft $d$ of a paper-bag machine, the lower carrying-rollers, $g$, and upper carrying-rollers, $h$, with split holders for said upper rollers secured to said shaft $d$, and clamping-screws for said holders, substantially as shown.

7. In combination with the opposing carrying-belts of a paper-bag machine, the longitudinal adjustable guide P' and the grooved adjusting-roller Q', turning in a plane coincident with the plane of the passing blank to act upon the edge of the latter, substantially as described.

8. In a paper-bag machine, the centering fingers or parts $d^2$ and $d^4$, on opposite sides of the sheet, the connection $k^2$, and the reciprocating actuating-lever $l^2$, by means of which said parts $d^2$ and $d^4$ are caused to move toward each other to touch the opposite edges of said sheet, substantially as described.

9. In combination with the frame of a paper-bag machine, the pivoted adjuster $d^2$ and the opposing adjustable pivoted adjuster $d^4$, with the connection $k^2$ and actuating-lever $l^2$, substantially as shown and described.

10. In a paper-bag machine, the opposing adjusters $d^2$ and $d^4$ and the connection $k^2$, in combination with the pivoted actuating-lever $l^2$ and rocking hub $C^4$, substantially as shown.

11. The rocking hub $C^4$ and a lever pivoted to said hub, the latter having an extension bearing upon said lever between the pivot and the end of said lever, in combination with the opposing adjusters $d^2$ and $d^4$ and the connection for said adjusters and said lever, substantially as shown and described.

12. The rocking hub $C^4$ and a lever pivoted thereto, said hub being formed with a projection to move said lever, said projection being provided with an adjusting-screw to regulate the movements of said lever, in combination with opposing adjusters for the sheets of paper and a connection for said lever and adjusters, substantially as described.

13. The ironing-wheel and lapping-belt for said wheel, with holding-pulleys for said belt, in combination with a chute for the unfinished bags and rotating urging-roller for the latter, substantially as described.

14. The ironing-wheel and lapping-belt for said wheel, with holding-pulleys for said belt, in combination with a chute for the unfinished bags and rotating urging-roller for the latter, said roller being held upon adjustable bearings, substantially as shown.

15. The ironing-wheel provided with an absorbent covering for the face thereof, and lapping-belt for said covered wheel, in combination with a stripper for said wheel held to touch the surface of said covering, substantially as shown and described.

16. The lapping-belt $D^2$, with holding-pulley $F^2$ for the same, in combination with detent or compressing springs held to press the surface of said belt as it passes over said pulley, substantially as shown and described.

17. The lapping-belt, with holding-pulley $F^2$ for the same, in combination with detent or compressing springs held to press the surface of said belt as it passes over said pulley, said springs being attached adjustably to a holder or support, $E^4$, substantially as shown.

18. A presser-bar for the bags and detent-springs held to bear upon the surface of the lapping-belt in combination with said belt and the pulley $F^2$, for carrying the same, said presser-bar being adjustable, substantially as described.

19. A presser-bar for the bags and detent-springs held to bear upon the surface of the lapping-belt, in combination with said belt and the pulley $F^2$, for carrying the same, substantially as and for the purpose set forth.

20. In combination with the carrying-belts of a paper-bag machine, a device, $O'$, for turning the blanks, and a pressing-disk, $g^3$, said turning device and disk being preceded and followed by devices, substantially as shown, for pasting and folding said blanks, substantially as described.

HENRY R. CORKHILL, Sr.

Witnesses:
E. B. WHITMORE,
H. B. KNIGHT.